US00RE48584E

(19) United States
(12) Reissued Patent
Kraus et al.

(10) Patent Number: US RE48,584 E
(45) Date of Reissued Patent: Jun. 8, 2021

(54) METHOD FOR REINFORCING A BUILDING COMPONENT

(71) Applicants: COVESTRO DEUTSCHLAND AG, Leverkusen (DE); KARLSRUHER INSTITUT FÜR TECHNOLOGIE, Karlsruhe (DE)

(72) Inventors: Harald Kraus, Leverkusen (DE); Wolfgang Arndt, Dormagen (DE); Matthias Wintermantel, Bergisch Gladbach (DE); Heinz-Werner Lucas, Bergisch Gladbach (DE); Dirk Dijkstra, Cologne (DE); Lothar Stempniewski, Ettlingen (DE); Moritz Urban, Albersweiler (DE)

(73) Assignee: COVESTRO DEUTSCHLAND AG, Leverkusen (DE)

(21) Appl. No.: 16/249,995

(22) Filed: Jan. 17, 2019

Related U.S. Patent Documents

Reissue of:
(64) Patent No.: 9,546,490
Issued: Jan. 17, 2017
Appl. No.: 14/237,452
PCT Filed: Aug. 6, 2012
PCT No.: PCT/EP2012/065358
§ 371 (c)(1),
(2) Date: Mar. 27, 2014
PCT Pub. No.: WO2013/020950
PCT Pub. Date: Feb. 14, 2013

(30) Foreign Application Priority Data

Aug. 9, 2011 (EP) ..... 11176886

(51) Int. Cl.
*E04G 23/02* (2006.01)
*E04C 5/07* (2006.01)

(52) U.S. Cl.
CPC ..... *E04G 23/0218* (2013.01); *E04C 5/073* (2013.01); *E04G 2023/0251* (2013.01)

(58) Field of Classification Search
CPC . E04C 5/073; E04C 2/06; E04C 2/205; E04C 2/22; E04C 2/24; E04C 5/07;
(Continued)

(56) References Cited

U.S. PATENT DOCUMENTS 3,635,870 A 1/1972 Thoma et al.
3,640,937 A * 2/1972 Thoma et al. ..... 524/173
(Continued)

FOREIGN PATENT DOCUMENTS

CA 2253119 A1 5/1999
DE 1 570 540 A1 3/1970
(Continued)

OTHER PUBLICATIONS

International Search Report with English translation dated Jan. 29, 2013.
(Continued)

*Primary Examiner* — Carlos N Lopez
(74) *Attorney, Agent, or Firm* — Norris McLaughlin, P.A.

(57) ABSTRACT

A method for reinforcing a part of a building comprises the step of adhesively bonding a textile to the surface of the part of a building by means of an adhesive. The invention relates further to such a reinforced part of a building and to the use of a textile in combination with an adhesive for reinforcing a part of a building, wherein the textile is adhesively bonded to the surface of the part of a building by means of an adhesive.

13 Claims, 5 Drawing Sheets

(58) Field of Classification Search

CPC . E04F 13/0885; E04F 13/0887; E04F 13/002; E04F 13/02; E04F 13/04; E04F 13/07; E04B 1/62; E04B 1/66; E04B 1/7625; E04H 9/00; E04H 9/10; E04G 23/0218

See application file for complete search history.

(56) References Cited

U.S. PATENT DOCUMENTS

| | | | | |
|---|---|---|---|---|
| 3,640,967 | A | 2/1972 | König et al. | |
| 3,658,746 | A | 4/1972 | Rosendahl et al. | |
| 4,808,691 | A | 2/1989 | König et al. | |
| 5,552,207 | A * | 9/1996 | Porter et al. | 428/109 |
| 5,649,398 | A * | 7/1997 | Isley, Jr. et al. | 52/309.17 |
| 6,806,212 | B2 * | 10/2004 | Fyfe | 442/104 |
| 8,496,404 | B1 * | 7/2013 | Fyfe | 405/114 |
| 8,545,960 | B2 * | 10/2013 | McGuire et al. | 428/76 |
| 8,853,295 | B2 * | 10/2014 | Ludewig et al. | 522/174 |
| 2003/0105219 | A1 * | 6/2003 | Schutze | C08G 18/44 524/589 |
| 2003/0110733 | A1 * | 6/2003 | Grace et al. | 52/724.1 |
| 2012/0082906 | A1 | 4/2012 | Bulan et al. | |

FOREIGN PATENT DOCUMENTS

| | | | |
|---|---|---|---|
| DE | 1 902 931 | A1 | 8/1970 |
| DE | 1 918 504 | A1 | 10/1970 |
| DE | 1 770 245 | A1 | 10/1971 |
| DE | 1 770 591 | A1 | 11/1971 |
| DE | 37 10 168 | A1 | 10/1988 |
| DE | 37 17 060 | A1 | 12/1988 |
| DE | 43 22 462 | A1 | 1/1995 |
| DE | 37 10 168 | A1 | 10/1998 |
| DE | 10 2008 026 615 | A1 | 12/2009 |
| DE | 10 2010 042 004 | A1 | 4/2012 |
| EP | 0 916 647 | A2 | 5/1995 |
| JP | 2007 247290 | A | 9/2007 |
| WO | 95/34725 | A1 | 12/1995 |

OTHER PUBLICATIONS

Die Europaische Norm EN 12188: 1999 hat den Status einer Deutschen Norm, pp. 1-8, Jul. 1999.

Products and systems for the protection and repair of concrete structures—Test methods—Determination of adhesion steel-to-steel for characterization of structural bonding agents, pp. 1-14, Sep. 1999.

* cited by examiner

METHOD FOR REINFORCING A BUILDING COMPONENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a 371 of PCT/EP2012/065358, filed Aug. 6, 2012, which claims foreign priority benefit under 35 U.S.C. §119 of the European Patent Application No. 11176886.7 filed Aug. 9, 2011, the disclosures of which are incorporated herein by reference.

The present invention relates to a method for reinforcing a part of a building, comprising the step of adhesively bonding a textile to the surface of the part of a building by means of an adhesive. It relates further to such a reinforced part of a building, and to the use of a textile in combination with an adhesive for reinforcing a part of a building, wherein the textile is adhesively bonded to the surface of the part of a building by means of an adhesive.

Masonry has been used worldwide for thousands of years. Masonry consists substantially of an arrangement of bricks and joints. Owing to the arrangement of the components, masonry is a highly anisotropic building material and is highly suitable for vertical load transfer.

In addition to the joints and bricks, which are arranged differently vertically and horizontally, the anisotropic material properties of the individual components are mainly responsible for the direction-dependent behaviour of masonry. The resistance to axial loads is comparatively low. The horizontal loads which can be absorbed without failure are limited.

Horizontal accelerations induced by earthquakes in particular generate high horizontal loads on masonry structures. Damage to the supporting system of the structure results. The use of masonry in seismically active regions therefore requires improvements in horizontal load transfer. In existing structures in particular, retroactive reinforcing measures are required to comply with the design loads, which are generally laid down in standards.

Many different reinforcing methods have been developed for increasing the bearing capacity of masonry and thus permitting demonstration. One of those methods is the reinforcement of masonry close to the surface by means of fibre composite materials. Because the reinforcement is applied to the surface, the use is suitable in particular for reinforcing existing masonry panels. Studies in this connection in the past concentrated mainly on the use of woven fabrics in an epoxy resin matrix.

Because the structural-physical properties of epoxy resin are disadvantageous (impermeable to water vapour, smoke generation under the action of heat, loss of strength when exposed to heat), studies also continued using cement matrices enriched with epoxy resin.

WO 1995/034724 A1 describes a method for reinforcing walls in order to prevent damage such as occurs under atypical loads such as, for example, during an earthquake. The method comprises the step of applying a resin-impregnated woven fabric layer to a portion of an exposed wall that is to be reinforced. The method further comprises the step of anchoring the resin-impregnated woven fabric layer to a structural member of the wall by means of fastening elements, adhesives or a combination thereof.

U.S. Pat. No. 6,806,212 relates to a combination of a structure with a wall, which has a surface and a composite coating applied to the surface of the wall in order to reinforce the wall against explosive forces acting on the structure. A first layer comprising an elastomer is in intimate contact with the wall and adheres permanently thereto. A second layer comprising an elastomer is in intimate contact with the first layer and adheres permanently thereto. A textile is further incorporated between the first and the second layers, the elastomer being the product of a liquid precursor which cures under ambient conditions to form the elastomer. The purpose of the composite coating is to increase the ductility and elongation of the wall when sudden lateral or explosive forces act on the structure. The precursor is a two-component formulation which reacts after mixing to form an elastomer.

DE 10 2008 026615 A1 discloses a hybrid textile reinforcement structure for masonry, textile-reinforced structural members or reinforcing layers for structural members of minerally bonded building materials, in particular of concrete, in which lattice-like textile structures of concrete-compatible high-performance fibres are used as the reinforcement material. The lattice-like textile structure simultaneously has high-strength reinforcing elements in the longitudinal and/or transverse direction and is additionally provided in the longitudinal and/or transverse direction with elements that have high ductility. The high-strength reinforcing elements can consist of thread systems having a high modulus of elasticity, preferably of AR glass or carbon, which are arranged in parallel in the 0° and/or 90° direction. Furthermore, the ductile elements can consist of thread systems having a low modulus of elasticity, preferably of polypropylene or polyethylene, which are arranged in parallel in the 0° and/or 90° direction.

If materials or material combinations that are too rigid are adhesively bonded to a plaster surface, the tensile forces that occur in the textile cannot be distributed over the plaster surface and early failure of the structural member occurs. Furthermore, the plaster must first be removed when the materials are applied directly to the masonry.

Seismically induced loads place high demands on the supporting system of a structure, and the possibilities for reinforcement described in the prior art are not sufficient and must be improved further. In addition to the bearing capacity, the overall ductility (deformation capability) of the structure is to be taken into consideration. The purpose of a reinforcement is on the one hand to support the structure in the transfer of loads (increase the resistance) and on the other hand to improve the cohesion of the masonry components so that the bearing capacity is retained even in the case of major deformation (increase in the overall ductility).

The object underlying the present invention was, therefore, to provide such reinforcements and methods for their implementation.

The object is achieved according to the invention by a method for reinforcing a part of a building, comprising the step of adhesively bonding a textile to the surface of the part of a building by means of an adhesive, wherein the textile before the adhesive bonding has a ductility in each fibre direction of ≥1.0 (measured according to DIN EN ISO 13934-1 April 1999 edition; in order to avoid measuring errors caused by damage to the glass fibres on account of their sensitivity to transverse pressure, the ends of the test strips are bonded in metal jaws), the adhesive in the cured state has a ductility of ≥1.5 (measured according to DIN EN 12188, July 1999 edition; wherein the metal dies were replaced by equivalent dies made of concrete of a cylinder strength of at least 50 N/mm$^2$), and the part of a building after the adhesive bonding (which naturally also includes curing of the adhesive) has a ductility measured out-of-plane of ≥2, wherein the ductility is in each case determined as the ratio of the value of the total deformation, that is to say the sum of the elastic and plastic components, to the value of the elastic deformation. Where the ductility of a bearing element is concerned, the term overall ductility is used because it is not only the material that is important, but also the form of the bearing element and the nature of the load thereon (see e.g. Hugo Bachmann, "Erdbebensicherung von Bauwerken", 2nd revised edition, Chapter 3.5, Birkenhäuser Verlag, 2002, ISBN 3-7643-6941-8). The ductility of the adhesive or of the textile, on the other hand, is referred to as material ductility. A part of a building within the scope of the present invention is in particular a bearing or non-bearing wall. Pillars and other elements of a building are, however, also included according to the invention.

Preferably, the part of a building after the adhesive bonding has a ductility in the range from ≥2 to ≤30, particularly preferably in the range from ≥3 to ≤20.

The invention starts from the finding that, in masonry that is reinforced with fibre composite materials, a rapid response of the reinforcement is necessary in the case of a deforming load in order to increase the bearing capacity, and a high plastic extensibility is necessary in order to improve the ductility.

A tensile reinforcement of bearing and/or non-bearing masonry is hereby achieved.

As a result of the choice according to the invention of the textile and of the adhesive, the inherently low ductility of bearing elements made of masonry is increased to such an extent that greater seismic forces can be transferred. The textile allows the acting forces to be distributed over the entire wall surface. Cracks in the masonry are bridged by fibres of the same or different material. Owing to a correspondingly ductile adhesive, which provides for an areal distribution of the tensile forces, the textile is able to distort considerably, and high overall ductilities for the bearing element so reinforced are thus made possible.

The ability to undergo plastic deformation while maintaining a resisting force is referred to as ductility. An adequate bearing behaviour in the load case earthquake can be achieved equally as well by a high bearing capacity and a lower ductility as by a high ductility and a low bearing capacity.

Owing to a high outlay for increasing the bearing capacity, a design of a building for an earthquake which withstands the design quake in the linear-elastic behaviour range, that is to say no plastic deformation is permitted for the load case, is in most cases less economical than a ductile design, which permits greater plastic deformation for energy dissipation.

The ductility of the textile before the adhesive bonding is chosen according to the invention. This is to be understood as meaning the textile before it has come into contact with adhesive. Generally, therefore, the textile can be chosen on the basis of the material properties of the commercially available product without further treatment. This ductility is preferably from ≥1.0 to ≤20 and more preferably from ≥1.5 to ≤10.

Furthermore, the ductility of the adhesive in the cured state is chosen according to the invention. That state can be established, for example, after drying, film formation, cross-linking or other chemical reactions in the adhesive. The cured state is accordingly the final state which the adhesive assumes after application and when it no longer changes substantially. Because the cured state is taken into consideration, different formulations of the adhesive such as, for example, solids content, degree of dilution, solvent content and the like do not play a role. The ductility so chosen is preferably from ≥1.5 to ≤20 and more preferably from ≥2 to ≤10. The expression "cured state" refers to a material or an adhesive in which the polymerisation reaction has proceeded to completion and accordingly no reactive monomers are generally present.

The application of the adhesive can be carried out by means of spraying, brush application, roller application, spatula application and the like. Depending upon the adhesive used, an aeration period can be observed after the application before the textile is applied to the adhesive.

Suitable adhesives are in particular polyurethane adhesives because they can be obtained with the necessary ductility in the cured state.

Suitable textiles are in particular woven fabrics and knitted fabrics. In the case of a woven fabric, the desired ductility can be achieved by making the ground fabric of the textile comparatively coarse meshed/loose and additionally providing it with ductile fibres, which can be long or short. Examples of such fibres are those of glass, polyaramid, graphite, quartz, carbon fibres, ceramics, polyethylene, polypropylene, polyimide, polyamides or naturally occurring fibres. Particularly preferably, such fibres are chosen from the group consisting of glass, polyamide, graphite, quartz, carbon fibres, ceramics, polyethylene, polypropylene and polyimide. In the case of a mixed textile, the mentioned fibres having a high ductility are to be arranged on the part of a building horizontally and/or at an angle of from 30 to 60°.

According to the invention, in the case of a woven fabric, maximum tensile forces per metre of material in the weft direction (transversely) of from ≥45 kN to ≤70 kN and in the warp direction (longitudinally) of from ≥50 kN to ≤90 kN have been found to be suitable, in each case measured according to DIN EN ISO 13934-2 (April 1999 edition; in order to avoid measuring errors caused by damage to the glass fibres on account of their sensitivity to transverse pressure, the ends of the test strips are bonded in metal jaws).

The present invention is described further hereinbelow by means of embodiments. The embodiments can be combined as desired, provided the contrary is not clearly apparent from the context.

In one embodiment of the method according to the invention, the surface of the part of a building is a plaster surface. The term "plaster" is here to be understood generally as meaning a covering comprising plaster. Examples of such a plaster are lime plaster, lime-cement plaster, gypsum plaster, gypsum-lime plaster and gypsum-lime-cement plaster. Even existing buildings or parts of buildings/walls can thus be retrospectively reinforced without the existing plaster having to be removed. The thickness of the plaster can be, for example, in a range from ≥0.5 cm to ≤5.0 cm. It is further preferred for the adhesive shear strength measured according to DIN 16964 or alternatively for the adhesion according to DIN EN 1542, July 1999 edition, between the plaster and the underlying stone or masonry to have a value of ≥0.15 N/mm$^2$ at an application thickness of the plaster of ≤1.2 cm. In dependence upon the quality of the plaster and the surface condition of the masonry, an increase in tensile strength per metre of textile of, for example, from 8 kN to 35 kN can be achieved.

In a further embodiment of the method according to the invention, the adhesive is first applied to the surface of the part of a building and the textile is subsequently affixed to the applied adhesive. This simplifies the method further, because it is not necessary to work with textile sheets impregnated with adhesive. Although not necessary in principle, further adhesive can be applied to the affixed textile, if desired.

In a further embodiment of the method according to the invention, the ratio of the ductility of the textile before the adhesive bonding to the ductility of the adhesive in the cured state is as far as possible in the range from 1:1 to 1:10. Adjusting the ductilities in this manner allows particularly effective force absorption and force transmission to adhesively bonded textile to be achieved. Preference is given to a range from 1:2 to 1:5, more preferably from 1:3 to 1:4.

In a further embodiment of the method according to the invention, the textile comprises a glass fibre woven fabric, and the glass fibre woven fabric comprises glass fibres running at right angles to one another. Particularly suitable is a glass fibre woven fabric in plain weave in which glass fibre rovings of E glass or AR glass having a filament count of from 1 k to 3 k or even up to 6 k are interwoven.

In a further embodiment of the method according to the invention, the textile comprises fibres which have an additional coating. Various methods such as spraying, dipping, impregnation and others can be used. The coating is to protect the fibres from notch-forming and chemical stresses both during and after application of the textile. Its main function is to improve the bond between the textile and the surface of the structural member.

In a further embodiment of the method according to the invention, the textile comprises an at least biaxial woven fabric, and additional fibres are arranged in the form of a nonwoven on the at least biaxial woven fabric. Those fibres are preferably arranged on the rear side, that is to say the side facing the part of a building and accordingly the adhesive. The fibres can also already be adhesively bonded with the woven fabric. In that manner, mechanical failure of the fibres does not occur simultaneously, but in succession. Suitable fibres are in particular polyolefin fibres such as polyethylene and polypropylene fibres. It is advantageous if those fibres are much shorter than the threads of the woven fabric. For example, the fibre length can be from 0.5 cm to 10 cm.

Most particular preference is given to a biaxial glass fibre woven fabric with glass fibres running at right angles to one another, wherein the glass fibres carry an additional coating and additional fibres, preferably highly ductile polypropylene fibres, are arranged in the form of a nonwoven on the glass fibres.

In a further embodiment of the method according to the invention, the adhesive comprises an aqueous polyurethane dispersion. Preferably it is an aqueous polyurethane dispersion containing polyurethanes (A) which are reaction products of the following components:

A1) polyisocyanates,

A2) polymeric polyols having mean molar weights of from ≥400 g/mol to ≤8000 g/mol, determined according to DIN 55672-1, A3) optionally mono- and/or poly-alcohols or mono- and/or poly-amines or amino alcohols having molar weights of ≤400 g/mol, as well as at least one compound selected from A4) compounds which have at least one ionic or potentially ionic group and A5) non-ionically hydrophilised compounds.

A potentially ionic group is a group which is capable of forming an ionic group.

The polyurethanes (A) are preferably prepared from ≥7 wt. % to ≤45 wt. % A1), ≥50 to ≤91 wt. % A2), ≥0 to ≤15 wt. % A5), ≥0 to ≤12 wt. % ionic or potentially ionic compounds A4) and optionally ≥0 to ≤30 wt. % compounds A3), wherein the sum of A4) and A5) is ≥0.1 to ≤27 wt. % and the sum of the components is 100 wt. %.

The polyurethanes (A) are particularly preferably composed of ≥10 to ≤35 wt. % A1), ≥55 to ≤90 wt. % A2), ≥0 to ≤10 wt. % A5), ≥1 to ≤9 wt. % ionic or potentially ionic compounds A4) and optionally ≥0 to ≤10 wt. % compounds A3), wherein the sum of A4) and A5) is ≥0.1 to ≤19 wt. % and the sum of the components is 100 wt. %.

The polyurethanes (A) are most particularly preferably prepared from ≥15 to ≤35 wt. % A1), ≥55 to ≤75 wt. % A2), ≥0 to ≤8 wt. % A5), ≥1 to ≤5 wt. % ionic or potentially ionic compounds A4) and optionally ≥0 to ≤8 wt. % compounds A3), wherein the sum of A4) and A5) is ≥0.1 to ≤10 wt. % and the sum of the components is 100 wt. %.

Suitable polyisocyanates (A1) are aromatic, araliphatic, aliphatic or cycloaliphatic polyisocyanates. Mixtures of such polyisocyanates can also be used. Examples of suitable polyisocyanates are butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof of any desired isomer content, isocyanatomethyl-1,8-octane diisocyanate, 1,4-cyclohexylene diisocyanate, 1,4-phenylene diisocyanate, 2,4- and/or 2,6-toluene diisocyanate, 1,5-naphthylene diisocyanate, 2,4'- or 4,4'-diphenylmethane diisocyanate, triphenylmethane-4,4',4"-triisocyanate or derivatives thereof having a urethane, isocyanurate, allophanate, biuret, uretdione, iminooxadiazinedione structure and mixtures thereof. Preference is given to hexamethylene diisocyanate, isophorone diisocyanate and the isomeric bis(4,4'-isocyanatocyclohexyl)methanes and mixtures thereof.

The polyisocyanates are preferably polyisocyanates or polyisocyanate mixtures of the mentioned type with only aliphatically and/or cycloaliphatically bonded isocyanate groups. Preference is further given to 2,4- and/or 2,6-toluene diisocyanate. Most particularly preferred starting components (A1) are polyisocyanates or polyisocyanate mixtures based on HDI, IPDI and/or 4,4'-diisocyanatodicyclohexylmethane.

Further suitable as polyisocyanates (A1) are any desired polyisocyanates having a uretdione, isocyanurate, urethane, allophanate, biuret, iminooxadiazinedione and/or oxadiazinetrione structure prepared by modification of simple aliphatic, cycloaliphatic, araliphatic and/or aromatic diisocyanates and composed of at least two diisocyanates, as are described, for example, in J. Prakt. Chem. 336 (1994) p. 185-200.

Suitable polymers (A2) have an OH functionality of from ≥1.5 to ≤4, such as, for example, polyacrylates, polyesters, polylactones, polyethers, polycarbonates, polyester carbonates, polyacetals, polyolefins and polysiloxanes. Preference is given to polyols in a molecular weight range from ≥400 g/mol to ≤2500 g/mol having an OH functionality of from ≥1.9 to ≤3.

The hydroxyl-group-containing polycarbonates that are suitable are obtainable by reaction of carbonic acid derivatives, for example diphenyl carbonate, dimethyl carbonate or phosgene, with diols. There are suitable as such diols, for example, ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A, but also lactone-modified diols. Preferably, the diol component contains from ≥40 wt. % to ≤100 wt. % hexanediol, preferably 1,6-hexanediol, and/or hexanediol derivatives, preferably those which, in addition to containing terminal OH groups, contain ether or ester groups, for example products obtained by reaction of 1 mol of hexanediol with at least 1 mol, preferably from 1 to 2 mol, caprolactone according to DE-A 1 770 245 or by etherification of hexanediol with itself to form di- or tri-hexylene glycol. The preparation of such derivatives is known, for example, from DE-A 1 570 540. The polyether polycarbonate diols described in DE-A 3 717 060 can also be used.

The hydroxyl polycarbonates should preferably be linear. However, they can optionally be branched slightly by the incorporation of polyfunctional components, in particular low molecular weight polyols. There are suitable for that purpose, for example, glycerol, trimethylolpropane, 1,2,6-hexanetriol, 1,2,4-butanetriol, trimethylolpropane, pentaerythritol, quinitol, mannitol and sorbitol, methyl glycoside, 1,3,4,6-dianhydrohexitols.

Suitable as polyether polyols are the polytetramethylene glycol polyethers known per se in polyurethane chemistry, which can be prepared, for example, by polymerisation of tetrahydrofuran by cationic ring opening.

Suitable polyether polyols (A2) are additionally the polyaddition products of ethylene oxide, propylene oxide, butylene oxide, styrene oxide or epichlorohydrin prepared using starter molecules, as well as the copolyaddition and graft polyaddition products thereof, as well as the polyethers obtained by condensation of polyhydric alcohols or mixtures thereof and the polyethers obtained by alkoxylation of water, polyhydric alcohols, amines or amino alcohols. Preference is given to homo- and/or co-polyaddition compounds of ethylene oxide and/or propylene oxide having a number-average molecular weight of from 400 to 4000 Da, particularly preferably from 400 to 2500 Da, most particularly preferably from 800 to 2000 Da. The mean functionality of the polyether polyols is greater than 1.85, preferably from 1.88 to 3. Particular preference is given to difunctional polyethers having a functionality of from 1.92 to 2.05.

The amount of ethylene oxide in the homo- and/or co-polyaddition compounds of ethylene oxide and/or propylene oxide is from 0 to 100%, preferably from 0 to 30%, particularly preferably from 0 to 10%.

In a particularly preferred embodiment of the present invention, the polyether polyol (A) is a homopolyaddition product of propylene oxide having a molecular weight of from 800 to 2000 Da and a functionality of from 1.92 to 2.05.

Suitable as polyester polyols are, for example, reaction products of polyhydric, preferably dihydric and optionally in addition trihydric alcohols with polyvalent, preferably divalent, carboxylic acids. Instead of the free polycarboxylic acids, the corresponding polycarboxylic acid anhydrides or corresponding polycarboxylic acid esters of lower alcohols or mixtures thereof can be used to prepare the polyesters. The polycarboxylic acids can be of aliphatic, cycloaliphatic, aromatic and/or heterocyclic nature and can optionally be substituted, for example by halogen atoms, and/or unsaturated.

Particularly preferred polymeric polyols (A2) are polycarbonates and polyethers, most particularly preferably polyethers.

The components (A3) are suitable for the chain extension and/or termination of the polyurethane prepolymer. There come into consideration monofunctional alcohols and monoamines. Preferred monoalcohols are aliphatic monoalcohols having from 1 to 18 carbon atoms, such as, for example, ethanol, n-butanol, ethylene glycol monobutyl ether, 2-ethylhexanol, 1-octanol, 1-dodecanol or 1-hexadecanol. Preferred monoamines are aliphatic monoamines, such as, for example, diethylamine, dibutylamine, ethanolamine, N-methylethanolamine or N,N-diethanolamine, and amines of the Jeffamin® M series (Huntsman Corp. Europe, Belgium) or amino-functional polyethylene oxides and polypropylene oxides.

Likewise suitable as component (A3) are polyols, aminopolyols or polyamines having a molar weight of less than 400 g/mol, which are described in large numbers in the corresponding literature.

Preferred components (A3) are, for example:

a) alkane-diols and -triols, such as ethanediol, 1,2- and 1,3-propanediol, 1,4- and 2,3-butanediol, 1,5-pentanediol, 1,3-dimethylpropanediol, 1,6-hexanediol, neopentyl glycol, 1,4-cyclohexanedimethanol, 2-methyl-1,3-propanediol, 2-ethyl-2-butylpropanediol, trimethylpentanediol, position isomeric diethyloctanediols, 1,2- and 1,4-cyclohexanediol, hydrogenated bisphenol A [2,2-bis(4-hydroxycyclohexyl)-propane], 2,2-dimethyl-3-hydroxypropionic acid (2,2-dimethyl-3-hydroxypropyl ester), trimethylolethane, trimethylolpropane or glycerol, b) ether diols, such as diethylene diglycol, triethylene glycol, tetraethylene glycol, dipropylene glycol, tripropylene glycol, 1,3-butylene glycol or hydroquinone dihydroxyethyl ether, c) ester diols of the general formulae (I) and (II), $$HO—(CH_2)_x—CO—O—(CH_2)_y—OH \quad (I)$$

$$HO—(CH_2)_x—O—CO—R—CO—O(CH_2)_xOH \quad (II)$$

in which

R is an alkylene or arylene radical having from 1 to 10 carbon atoms, preferably from 2 to 6 carbon atoms, x is from 2 to 6 and y is from 3 to 5, such as, for example, 6-hydroxybutyl-ε-hydroxy-caproic acid ester, ω-hydroxyhexyl-γ-hydroxy-butyric acid ester, adipic acid (β-hydroxyethyl) ester and terephthalic acid bis(β-hydroxy-ethyl) ester and d) di- and poly-amines such as, for example, 1,2-diaminoethane, 1,3-diaminopropane, 1,6-diaminohexane, 1,3- and 1,4-phenylenediamine, 4,4'-diphenylmethanediamine, isophoronediamine, isomer mixture of 2,2,4- and 2,4,4-trimethylhexamethylenediamine, 2-methyl-pentamethylenediamine, diethylenetriamine, 1,3- and 1,4-xylylenediamine, α,α,α,α'-tetramethyl-1,3- and -1,4-xylylenediamine, 4,4-diaminodicyclohexylmethane, amino-functional polyethylene oxides or polypropylene oxides, which are obtainable under the name Jeffamin®, D series (Huntsman Corp. Europe, Belgium), diethylenetriamine and triethylenetetramine. Also suitable as diamines within the scope of the invention are hydrazine, hydrazine hydrate and substituted hydrazines, such as, for example, N-methylhydrazine, N,N'-dimethylhydrazine and their homologues, as well as acid dihydrazides, adipic acid, β-methyladipic acid, sebacic acid, hydracrylic acid and terephthalic acid, semicarbazido-alkylene hydrazides, such as, for example, β-semicarbazidopropionic acid hydrazide (described, for example, in DE-A 1 770 591), semicarbazidoalkylene carbazine esters, such as, for example, 2-semicarbazidoethyl carbazine esters (described, for example, in DE-A 1 918 504) or also am inosemicarbazide compounds, such as, for example, β-aminoethylsemicarbazidocarbonate (described, for example, in DE-A 1 902 931).

Component (A4) contains ionic groups which can be of either cationic or anionic nature. Compounds having a cationically or anionically dispersing action are those which, for example, are containing sulfonium, ammonium, phosphonium, carboxylate, sulfonate, phosphonate groups or groups which can be converted into the above-mentioned groups by salt formation (potentially ionic groups) and can be incorporated into the macromolecules by isocyanate-reactive groups that are present. Suitable isocyanate-reactive groups are preferably hydroxyl and amine groups.

Suitable ionic or potentially ionic compounds (A4) are, for example, mono- and di-hydroxycarboxylic acids, mono- and di-aminocarboxylic acids, mono- and di-hydroxysulfonic acids, mono- and di-aminosulfonic acids as well as mono- and di-hydroxyphosphonic acids or mono- and di-aminophosphonic acids and their salts, such as dimethylolpropionic acid, dimethylolbutyric acid, hydroxypivalic acid, N-(2-aminoethyl)-β-alanine, 2-(2-amino-ethylamino)-ethanesulfonic acid, 1,2- or 1,3-propylenediamine-β-ethylsulfonic acid, ethylenediamine-propyl- or -butylsulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and its alkali and/or ammonium salts; the adduct of sodium bisulfite on 2-butene-1,4-diol, polyether sulfonate, the propoxylated adduct of 2-butenediol and $NaHSO_3$ described, for example, in DE-A 2 446 440 (page 5-9, formulae I-III) as well as structural units which can be converted into cationic groups, such as N-methyl-diethanolamine as hydrophilic chain-extension components. Preferred ionic or potentially ionic compounds are those which have carboxy or carboxylate and/or sulfonate groups and/or ammonium groups. Particularly preferred ionic compounds are those which contain carboxyl and/or sulfonate groups as ionic or potentially ionic groups, such as the salts of N-(2-aminoethyl)-β-alanine, of 2-(2-amino-ethylamino)ethanesulfonic acid or of the addition product of IPDI and acrylic acid (EP-A 0 916 647, Example 1) and of dimethylolpropionic acid. Most particular preference is given to the sodium salts of N-(2-aminoethyl)-β-alanine and 2-(2-amino-ethylamino-)-ethanesulfonic acid. Likewise most particularly preferred is dimethylpropionic acid.

Suitable compounds having a non-ionically hydrophilising action (A5) are, for example, polyoxyalkylene ethers which contain at least one hydroxy or amino group. Such polyethers contain an amount of from 30 wt. % to 100 wt. % structural units which are derived from ethylene oxide. There are suitable polyethers having a linear structure and a functionality of from 1 to 3, but also compounds of the general formula (III)

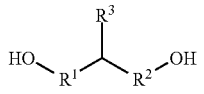

(III)

in which $R^1$ and $R^2$ each independently of the other denotes a divalent aliphatic, cycloaliphatic or aromatic radical having from 1 to 18 carbon atoms, which can be interrupted by oxygen and/or nitrogen atoms, and $R^3$ represents an alkoxy-terminated polyethylene oxide radical.

Compounds having a non-ionically hydrophilising action are, for example, also monohydric polyalkylene oxide polyether alcohols having in the statistical mean from ≥5 to ≤70, preferably from ≥7 to ≤55 ethylene oxide units per molecule, as are obtainable in a manner known per se by alkoxylation of suitable starter molecules (for example in Ullmanns Encyclopädie der technischen Chemie, 4th Edition, Volume 19, Verlag Chemie, Weinheim, p. 31-38).

Suitable starter molecules are, for example, saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetan or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleic alcohol, aromatic alcohols such as phenol, the isomeric cresols or methoxyphenols, araliphatic alcohols such as benzyl alcohol, anisic alcohol or cinnamic alcohol, secondary monoamines such as dimethylamine, diethylamine, dipropylamine, diisopropylamine, dibutylamine, bis-(2-ethylhexyl)-amine, N-methyl- and N-ethyl-cyclohexylamine or dicyclohexylamine, as well as heterocyclic secondary amines such as morpholine, pyrrolidine, piperidine or 1H-pyrazole. Preferred starter molecules are saturated monoalcohols. Diethylene glycol monobutyl ether is particularly preferably used as the starter molecule.

Alkylene oxides suitable for the alkoxylation reaction are in particular ethylene oxide and propylene oxide, which can be used in the alkoxylation reaction in any desired sequence or also in a mixture.

The polyalkylene oxide polyether alcohols are either pure polyethylene oxide polyethers or mixed polyalkylene oxide polyethers, the alkylene oxide units of which consist of at least 30 mol %, preferably at least 40 mol %, ethylene oxide units. Preferred non-ionic compounds are monofunctional mixed polyalkylene oxide polyethers which contain at least 40 mol % ethylene oxide units and not more than 60 mol % propylene oxide units.

For the preparation of the polyurethane (A), a combination of ionic (A4) and non-ionic (A5) hydrophilising agents can be used. Anionic hydrophilising agents are preferably used.

In a particularly preferred embodiment of the method according to the invention, the adhesive comprises an aqueous polyurethane dispersion (A) which is the reaction product of a mixture of HDI and IPDI (A1), a homopolyaddition product of propylene oxide having a molecular weight of from 800 to 1500 Da and a functionality of from 1.92 to 2.05 (A2), 1,4-butanediol (A3) and the sodium salt of 2-(2-amino-ethylamino)ethanesulfonic acid.

The preparation of the aqueous polyurethane (A) can be carried out in one or more stages in homogeneous phase or, in the case of a multi-stage reaction, partially in disperse phase. When the polyaddition has been carried out completely or partially, a dispersing, emulsifying or dissolving step takes place. This is optionally followed by a further polyaddition or modification in the disperse phase.

For the preparation of the polyurethane (A) there can be used all the processes known from the prior art, such as the emulsifier/shear force, acetone, prepolymer mixing, melt emulsification, ketimine and solid spontaneous dispersion process or derivatives thereof. A summary of these methods is to be found in Methoden der organischen Chemie (Houben-Weyl, additional and continuation volumes to the 4th edition, Volume E20, H. Bartl and J. Falbe, Stuttgart, New York, Thieme 1987, p. 1671-1682). Preference is given to the melt emulsification, prepolymer mixing and acetone processes. Particular preference is given to the acetone process.

Conventionally, all or part of constituents (A2) to (A5) which do not contain primary or secondary amino groups, and a polyisocyanate (A1) are placed in the reactor for the preparation of a polyurethane prepolymer and, optionally diluted with a solvent that is miscible with water but inert towards isocyanate groups, but preferably without a solvent, heated to relatively high temperatures, preferably in the range from 50 to 120° C.

Suitable solvents are, for example, acetone, butanone, tetrahydrofuran, dioxane, acetonitrile, dipropylene glycol dimethyl ether and 1-methyl-2-pyrrolidone, which can be added not only at the beginning of the preparation but optionally also in portions at a later stage. Acetone and butanone are preferred. It is possible to carry out the reaction under normal pressure or elevated pressure, for example above the boiling temperature at normal pressure of a solvent such as, for example, acetone.

Furthermore, the catalysts known to accelerate the isocyanate addition reaction, such as, for example, triethylamine, 1,4-diazabicyclo-[2,2,2]-octane, dibutyltin oxide, tin dioctoate, dibutyltin dilaurate, tin bis-(2-ethylhexanoate), zinc dioctoate, zinc bis-(2-ethylhexanoate) or other organometallic compounds, can be introduced at the same time or metered in later.

Dibutyltin dilaurate, zinc dioctoate and zinc bis-(2-ethylhexanoate) are preferred, and zinc bis-(2-ethylhexanoate) is particularly preferred.

Any of constituents (A1), (A2), optionally (A3) and (A4) and/or (A5) not containing primary or secondary amino groups which were not added at the beginning of the reaction are then metered in and likewise heated to relatively high temperatures, preferably in the range from 50 to 120° C. In the preparation of the polyurethane prepolymer, the ratio of isocyanate groups to isocyanate-reactive groups is from ≥0.90 to ≤3, preferably from ≥0.95 to ≤2.5, particularly preferably from ≥1.05 to ≤2.0. The reaction of components (A1) to (A5) takes place, based on the total amount of isocyanate-reactive groups of the part of (A2) to (A5) that does not contain primary or secondary amino groups, partially or completely, but preferably completely. The degree of conversion is conventionally monitored by following the NCO content of the reaction mixture. To that end, spectroscopic measurements, for example infrared or near-infrared spectra, determinations of the refractive index and chemical analyses, such as titrations, of removed samples can be carried out. Polyurethane prepolymers which contain free isocyanate groups are obtained without a solvent or in solution.

After or during the preparation of the polyurethane prepolymers from (A1) and (A2) to (A5), the partial or complete salt formation of the groups having anionically and/or cationically dispersing action is carried out, if it has not yet been performed in the starting molecules. In the case of anionic groups, bases such as ammonia, ammonium carbonate or ammonium hydrogen carbonate, trimethylamine, triethylamine, tributylamine, diisopropylethylamine, dimethylethanolamine, diethylethanolamine, triethanolamine, potassium hydroxide or sodium carbonate are used, preferably triethylamine, triethanolamine, dimethylethanolamine or diisopropylethylamine. The amount of the bases is from 50 to 120%, preferably from 50 to 100% and particularly preferably from 60 to 90%, of the amount of the anionic groups. In the case of cationic groups, organic or inorganic acids are used. If only non-ionically hydrophilised compounds (A5) with ether groups are used, the neutralisation step is omitted. The neutralisation can also take place at the same time as the dispersion if the dispersing water already contains the neutralising agent.

Possible aminic components are (A2), (A3) and (A4), with which any remaining isocyanate groups can be reacted. This chain extension can be carried out either in solvent prior to the dispersion, during the dispersion or in water after the dispersion. If aminic components are used as (A4), the chain extension preferably takes place before the dispersion.

The aminic component (A3) or (A4) can be added to the reaction mixture diluted with organic solvents and/or with water. Preferably from ≥70 wt. % to ≤95 wt. % solvent and/or water are used. If a plurality of aminic components are present, the reaction can take place in succession in any desired sequence or simultaneously by addition of a mixture.

For the purpose of the preparation of the polyurethane dispersion (A), either the polyurethane prepolymers, optionally with pronounced shear, such as, for example, vigorous stirring or using a jet disperser, are introduced into the dispersing water or, vice versa, the dispersing water is stirred into the prepolymers. Then, if it has not taken place in the homogeneous phase, the molar mass increase can be effected by reaction of any isocyanate groups present with component (A2), (A3). The amount of polyamine (A2), (A3) used depends upon the unreacted isocyanate groups still present. Preferably from ≥45 to ≤100%, particularly preferably from ≥50 to ≤75%, of the amount of isocyanate groups are reacted with polyamines (A2), (A3).

The organic solvent can optionally be distilled off. The dispersions have a solids content of from ≥10 to ≤70 wt. %, preferably from ≥25 to ≤65 wt. % and particularly preferably from ≥30 to ≤60 wt. %.

The polyurethane dispersions can be used alone or with known binders, auxiliary substances and additives, in particular light stabilisers such as UV absorbers and sterically hindered amines (HALS), also antioxidants, fillers as well as paint additives, for example antisettling agents, antifoams and/or wetting agents, flow agents, reactive diluents, plasticisers, catalysts, auxiliary solvents and/or thickeners and additives such as, for example, dispersions, pigments, colourings or mattifying agents. In particular, combinations with polyurethane dispersions or polyacrylate dispersions, which can optionally also be hydroxy-functional, are possible without difficulty. The additives can be added to the PUR dispersions immediately before processing. However, it is also possible to add at least part of the additives before or during the dispersion of the binder or binder/crosslinker mixture. The choice and metered addition of those substances, which can be added to the individual components and/or to the mixture as a whole, are known to the person skilled in the art.

In a further embodiment of the method according to the invention, fastening elements embedded into the part of a building are provided, which fastening elements are accessible at the surface of the part of a building and to which the textile is adhesively bonded. Preferably, the accessible part of the fastening element is flush with the surface of the part of a building. Such a fastening element can be, for example, an anchor-type fastening element. It is further possible for the fastening element to pass through the part of a building and to be adhesively bonded with the textile on both sides.

The present invention further provides a reinforced part of a building comprising a textile adhesively bonded to its surface, wherein the textile before the adhesive bonding has a ductility of ≥1 and the adhesive in the cured state has a ductility of ≥1.5 and wherein the ductility is in each case determined as the ratio of the value of the total elastic and plastic deformation to the value of the elastic deformation. The reinforced part of a building subsequently has a ductility of ≥2, preferably ≥3.

The reinforced part of a building can naturally be obtained by a method according to the invention. It is further possible to use all the embodiments mentioned in connection with the method according to the invention individually or in combination for the production of the reinforced part of a building. For details, reference is made to the above embodiments in order to avoid unnecessary repetition.

Particular mention is to be made of a reinforced part of a building according to the invention wherein the textile comprises an at least biaxial woven fabric and additional fibres are arranged in the form of a nonwoven on the at least biaxial woven fabric.

Particular mention is further to be made of a reinforced part of a building according to the invention wherein the adhesive comprises an aqueous polyurethane dispersion.

The present invention relates likewise to the use of a textile in combination with an adhesive for reinforcing a part of a building, wherein the textile is adhesively bonded to the surface of the part of a building by means of an adhesive, wherein the textile before the adhesive bonding has a ductility of ≥1 and the adhesive in the cured state has a ductility of ≥1.5 and wherein the ductility is in each case determined as the ratio of the value of the total elastic and plastic deformation to the value of the elastic deformation.

It is further possible to use all the embodiments mentioned in connection with the method according to the invention individually or in combination for the production of the reinforced part of a building. For details, reference is made to the above embodiments in order to avoid unnecessary repetition.

Particular mention is to be made of a use according to the invention wherein the textile comprises an at least biaxial woven fabric and additional fibres in the form of a nonwoven are arranged on the at least biaxial woven fabric.

Particular mention is further to be made of a use according to the invention wherein the adhesive comprises an aqueous polyurethane dispersion.

BRIEF DESCRIPTION OF THE DRAWINGS

The present invention is explained further by the figures and examples hereinbelow, but without being limited thereto.

In the figures:

FIG. 1 shows the perpendicular laying of textiles within the context of the method according to the invention. Textile sheets 11, 12, 13 chosen according to the invention are adhesively bonded to masonry using adhesive chosen according to the invention. The sheets are overlapped so that, for example, the left-hand edges 1, 3, 7 of the textile sheets 11, 12, 13 lie beneath (or on top of) the right-hand edges 5, 9 of the sheets.

FIG. 2 shows masonry 15 additionally reinforced with an embedded fastening element in the form of an anchor 25. The anchor 25, which extends through the plaster layer 17, is fastened in the masonry 15 by means of mortar or adhesive 23. A textile 21 chosen according to the invention is adhesively bonded to the plaster 17 and the portion of the anchor 25 that extends to the outside by means of adhesive 19 chosen according to the invention. Interfaces between the layers are textile/adhesive 27 and 33, adhesive/plaster 29 and 35 and plaster/masonry 31 and 37.

FIG. 3 shows masonry 45 reinforced on both sides with an embedded fastening element in the form of an anchor (without a reference numeral; analogous to FIG. 2). Plaster layers 43, 47 are arranged on both sides of the masonry 45, through which the anchor projects. Textiles 39, 51 chosen according to the invention are adhesively bonded to the plaster layers 43, 47 by means of adhesive 41, 49 chosen according to the invention. Interfaces between the layers are textile/air 53 and 67, textile/adhesive 55 and 65, adhesive/plaster 57 and 63 and plaster/masonry 59 and 61.

FIG. 4 shows an example of a textile in the form of a woven fabric which can be used within the context of the choice according to the invention. The woven fabric is here in the form of a plain weave, weft threads 69 and warp threads 71, 73 and 75 being shown by way of example.

FIG. 5 shows a further example of a textile which can be used within the context of the choice according to the invention. This textile is a biaxial woven fabric in plain weave, weft threads 79 and warp threads 77 being shown by way of example. Additional fibres 81, 83 are arranged on the woven fabric in the form of a nonwoven or fleece.

FIG. 6 shows the load-displacement curves of two stone shear tests. Curve 601 represents a reinforced sample and curve 602 an unreinforced sample.

FIG. 7 shows the load-displacement curves of two plate bodies (consisting of 6 sand-lime bricks), which were determined in the 3-point bending test. Curve 701 represents a reinforced sample and curve 702 an unreinforced sample.

FIG. 8 shows the load-displacement curves of two plate bodies (consisting of 6 bricks), which were determined in the 3-point bending test. Curve 801 represents a reinforced sample and curve 802 an unreinforced sample.

FIG. 9 shows the shear stress-displacement curve of the adhesive used.

EXAMPLES

Example 1

Figure 1:
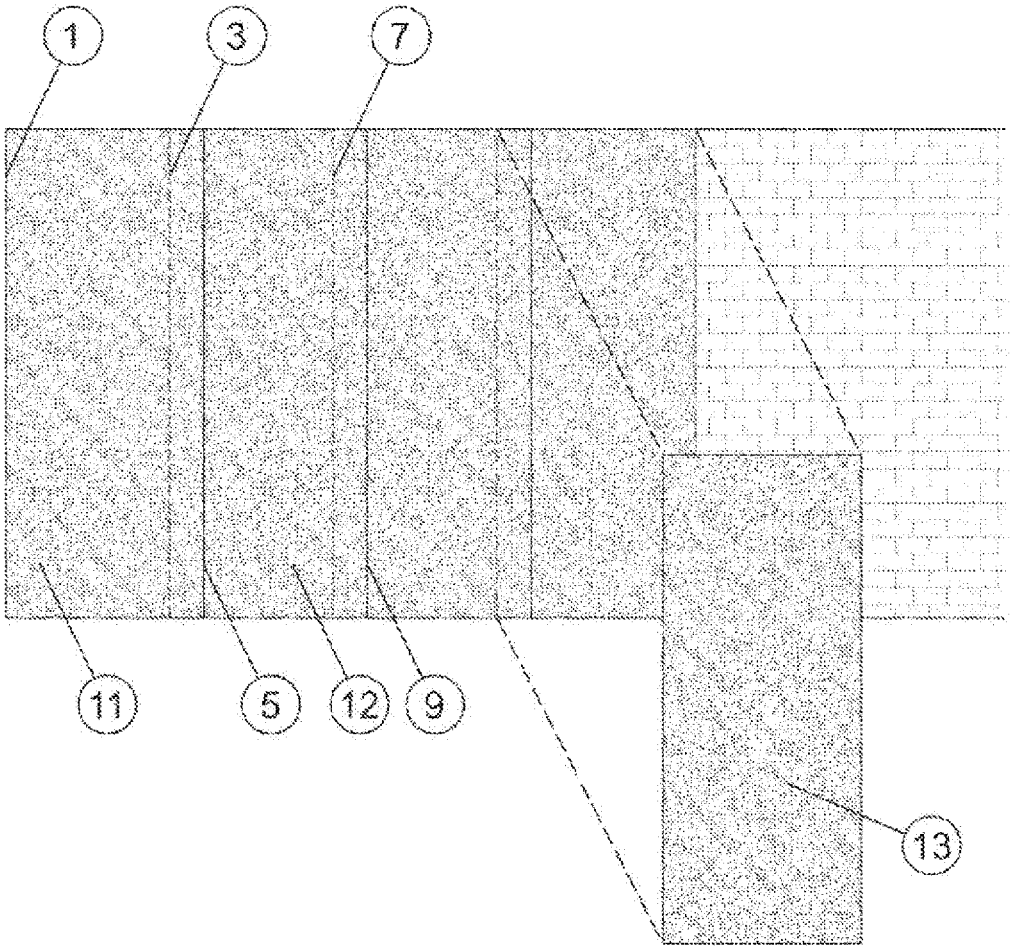
FIG. 1 shows the perpendicular laying of textiles in order to reinforce a part of a building
Figure 2:
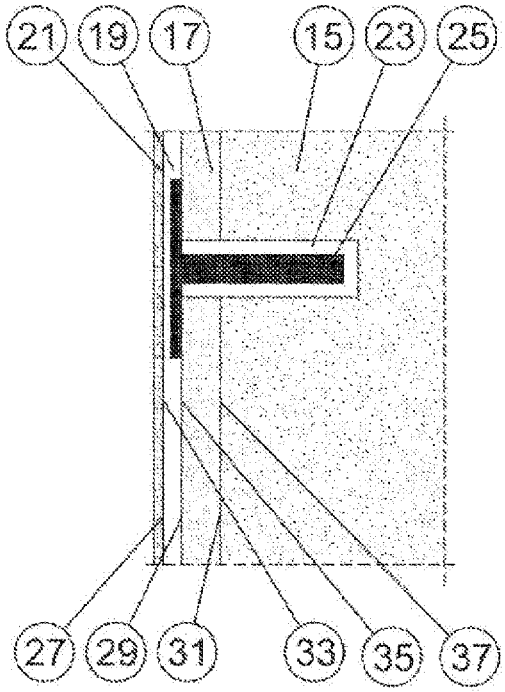
FIG. 2 shows a part of a building additionally reinforced with an embedded fastening element
Figure 3:
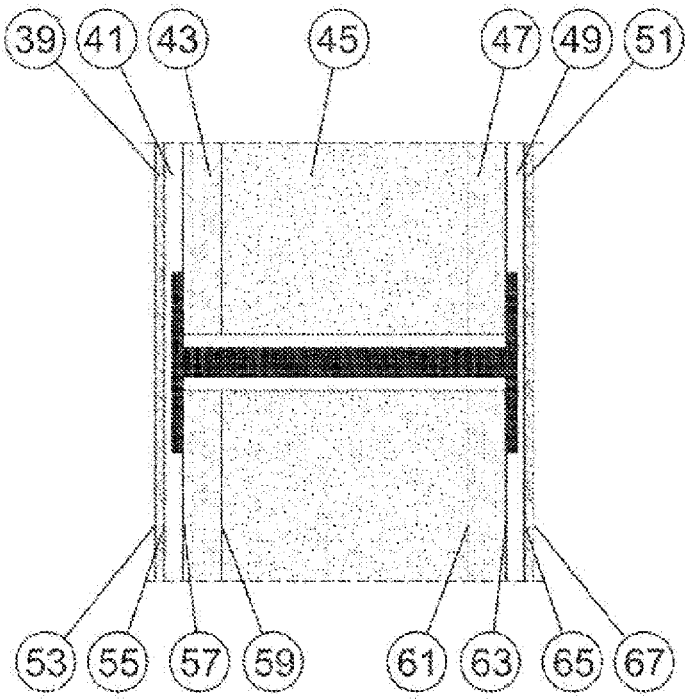
FIG. 3 shows a part of a building reinforced on both sides by an embedded fastening element
Figure 4:
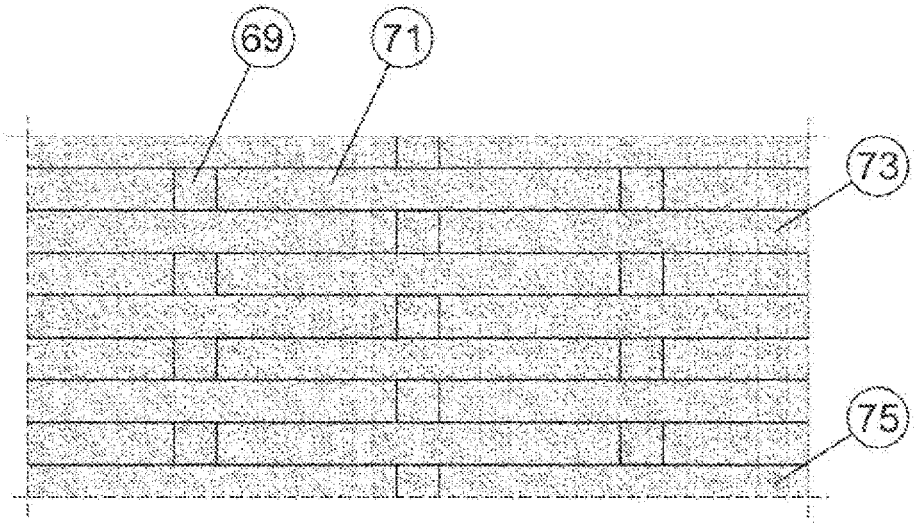
FIG. 4 shows a textile which can be used according to the invention
Figure 5:
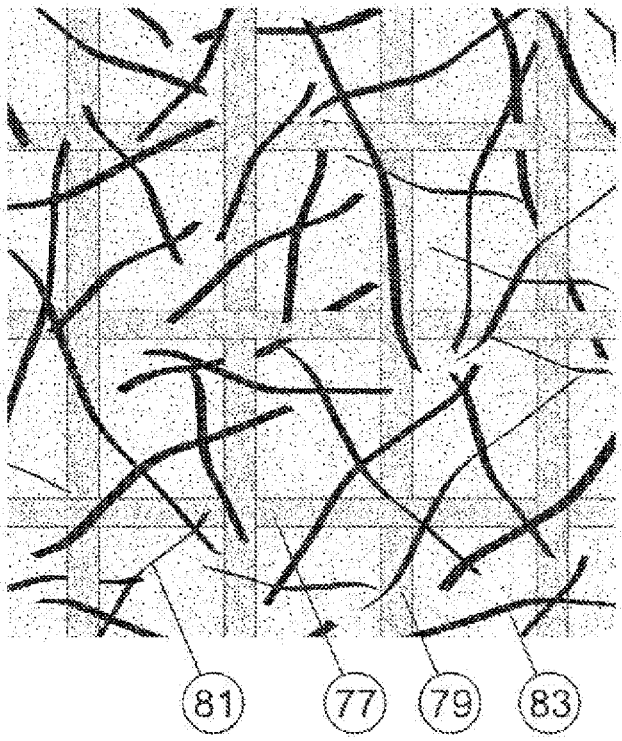
FIG. 5 shows a further textile which can be used according to the invention

Synthesis of an Adhesive 1 which can be used According to the Invention 1252.5 g of a polypropylene oxide diol (OH number 112, mean molecular weight 1000 g/mol) were dewatered for 60 minutes at 100° C. and 50 mbar. 112.4 g of 1,4-butanediol and 0.170 g of zinc bis-(2-ethylhexanoate) (Borchi® Kat 22 from OMG Borchers GmbH, Germany) were then added and the mixture was homogenised for 15 minutes at 90° C. After cooling to 70° C., 333.0 g of isophorone diisocyanate (IPDI) and 252.0 g of hexamethylene diisocyanate (HDI) were added and stirred in, and then the temperature was kept constant at 70° C. After 35 minutes, an isocyanate content of 1.74% had been reached. The mixture was cooled to 55° C., 2925 g of acetone were added, and stirring was carried out until the prepolymer was dissolved completely. A solution of 50.37 g of sodium salt of N-(2-aminoethyl)-2-aminoethanesulfonic acid in 435 g of water was added to the homogeneous solution at 48° C., with vigorous stirring, and stirring was carried out for a further 15 minutes at 48° C. 3320 g of water were then added to the acetone prepolymer mixture, with vigorous stirring, and dispersion was carried out for 20 minutes at 48° C. After removal of the acetone by distillation, an aqueous dispersion having a solids content of 34.9% was obtained.

5000 g of the aqueous dispersion were placed at room temperature in a 10-litre vessel, and 150 g of a mixture of 60 g of Borchi® Gel L 75 N (polyurethane-based, non-ionic liquid thickening agent, 50% delivery form from OMG Borchers GmbH, Germany) and 90 g of water were added with vigorous stirring (stirrer motor: Heidolph RZR 2100 electronic, stirrer: Visco Jet®, speed about 1000 rpm). Stirring was then carried out for a further 30 minutes. The resulting dispersion had a solids content of 34.7% and a Brookfield viscosity of 197,000 m Pas (measured with a Brookfield DV-III Ultra viscometer, spindle 4/1 rpm 23° C.).

Example 2

Axial Deformation Tests (In-Plane Load)

Figure 6:
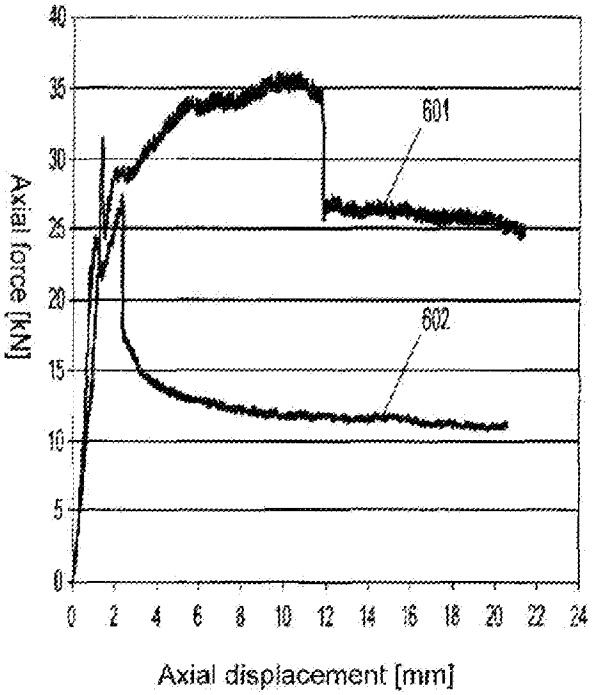
FIG. 6 shows the results of an axial deformation test (sand-lime masonry)

A textile of ductility 1 was adhesively bonded to the surface of plastered sand-lime masonry using the adhesive according to Example 1. The results shown in curve 601 in FIG. 6 were obtained in an axial deformation test according to DIN 1052-3. For comparison, a test was carried out using masonry which was not reinforced according to the invention but was only plastered. The results of that test are shown in curve 602. A significant improvement in the axial deformation behaviour compared with the comparison test is apparent. After the adhesive bonding and curing of the adhesive, the masonry so obtained had a ductility of approximately 20 mm/1 mm=20, 20 mm plastic deformation to 1 mm plastic deformation (see FIG. 6, curve 601). The unreinforced test specimen, on the other hand, has a ductility of only 1, because the bearing capacity falls dramatically immediately after the maximum load has been reached (FIG. 6, curve 602).

Example 3a

Plate Bending Test (Out-of-Plane Load)

Figure 7:
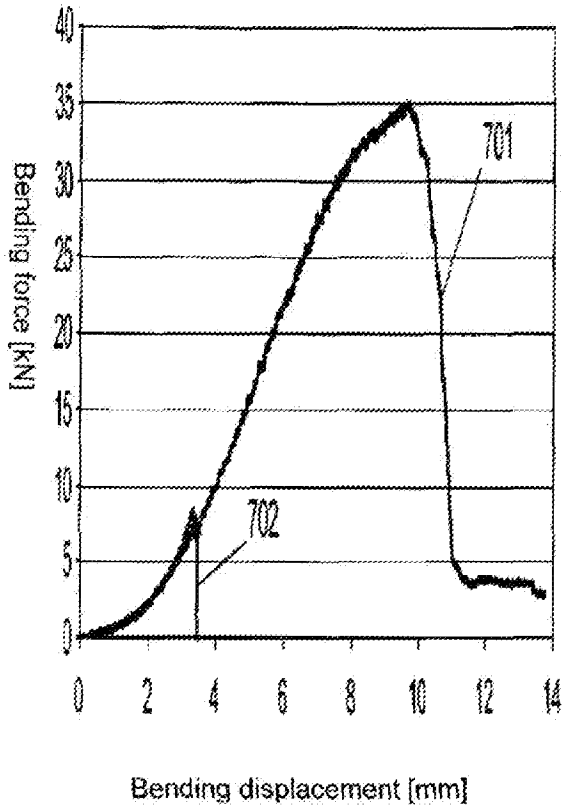
FIG. 7 shows the results of a plate bending test (sand-lime masonry)

A textile of ductility 1 was adhesively bonded to plastered sand-lime masonry using the adhesive according to Example 1. The results of the plate test are shown in FIG. 7, curve 701. For comparison, a test was carried out with masonry that was not reinforced according to the invention but only plastered. The results of that test are shown in FIG. 7, curve 702. A significant improvement in the plate as compared with the comparison test is apparent.

After the adhesive bonding and curing of the adhesive, the masonry so obtained had a ductility compared with the unreinforced plate of approximately 10/3.5=2.9 (FIG. 7), 10 mm bow in the centre of the plate of the reinforced wall (see FIG. 7, curve 701) to 3.5 mm bow in the centre of the plate of the unreinforced wall (see FIG. 7, curve 702).

Example 3b

Plate Bending Test (Out-of-Plane Load)

Figure 8:
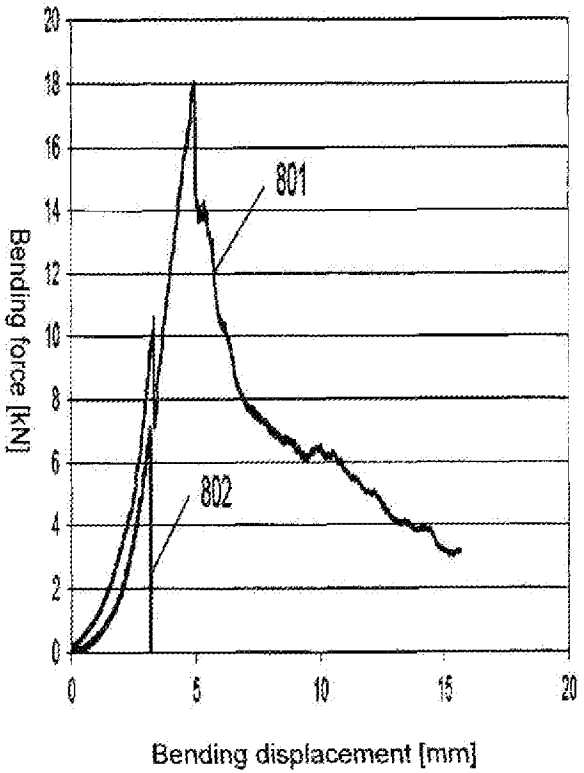
FIG. 8 shows the results of a plate bending test (brick masonry)

A textile of ductility 1 was adhesively bonded to plastered brick masonry using the adhesive according to Example 1. The results of the plate test are shown in FIG. 8 in curve 801. For comparison, a test was carried out with masonry that was not reinforced according to the invention but only plastered. The results of that test are shown in curve 802. A significant improvement in the plate as compared with the comparison test is apparent.

After the adhesive bonding and curing of the adhesive, the masonry so obtained had a ductility compared with the unreinforced wall of approximately 5/3.5=1.4 (FIG. 8), 5 mm bow at maximum load in the centre of the plate of the reinforced plate (see FIG. 8, curve 801) to 3.5 mm bow in the centre of the plate of the unreinforced wall (see FIG. 8, curve 802). The reinforced plate (see FIG. 8, curve 801) does not exhibit brittle fracture, unlike the unreinforced sample (see FIG. 8, curve 802), and has a marked fracture behaviour with residual bearing capacity.

Example 4

Shear Strength of the Adhesive According to DIN 12188

Figure 9:
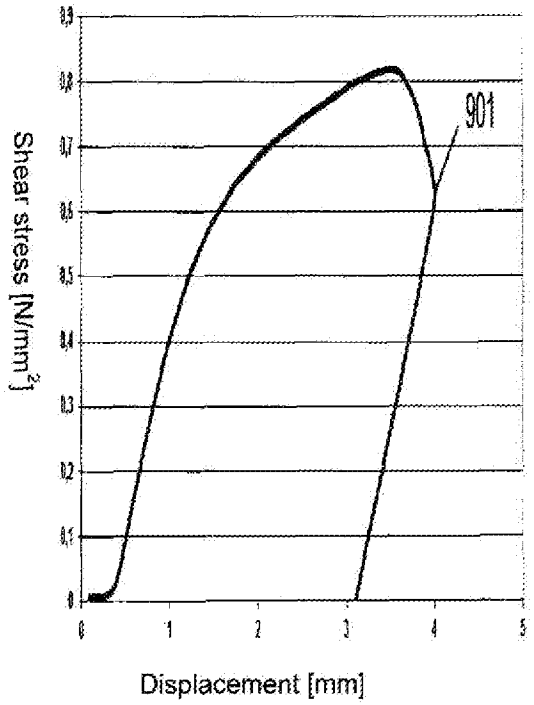
FIG. 9 shows the shear strength of the adhesive

An adhesive according to Example 1 is used for the adhesive bonding of a concrete body which was produced in accordance with DIN 12188 with the dimensions 160 mm×40 mm×40 mm. A through-cut was made transversely to the longer side at an angle of 45°. The two cut edges were wetted with adhesive and bonded together. The pressure load in the direction of the longer side caused the two halves of the sample to shear off. The resulting shear stress-displacement curve 901 is shown in FIG. 9. When the pressure is removed from the sample, a permanent displacement of 3 mm is measured, which is a measure of the plastic behaviour and accordingly also of the ductility.

The invention claimed is:

1. Method for reinforcing a part of a building, comprising the step of adhesively bonding a textile to the surface of the part of the building by means of an adhesive, wherein the textile before the adhesive bonding has a ductility of ≥1.0, the adhesive in the cured state has a ductility of ≥1.5 and the part of a building after the adhesive bonding has a ductility of ≥2, wherein the ductility is in each case determined as the ratio of the value of the total elastic and plastic deformation to the value of the elastic deformation, and wherein the adhesive comprises an aqueous polyurethane dispersion comprising a polyurethane dispersed in water, wherein the polyurethane is the reaction product of the following components:

A1) polyisocyanates,

A2) polymeric polyols and/or polyamines having weight-average molar weights of from ≥400 g/mol to ≤8000 g/mol,

*and at least one compound selected from the group consisting of:*

A4) [at least one compound selected from compounds which have at least one ionic or potentially ionic group]

*compounds which have in addition to isocyanate-reactive groups also sulfonium, ammonium, phosphate, phosphonium, carboxylate, sulfonate, or phosphonate groups, or groups that can be converted into sulfonium, ammonium, phosphate, phosphonium, carboxylate, sulfonate, or phosphonate groups by salt formation*, and A5) non-ionically hydrophilised compounds.

2. Method according to claim 1, wherein the textile before the adhesive bonding has a ductility in the range from ≥1.5 to ≤20.

3. Method according to claim 1, wherein the adhesive in the cured state has a ductility in the range from ≥1.5 to ≤20.

4. Method according to claim 1, wherein the part of a building after the adhesive bonding has a ductility in the range from ≥2 to ≤30.

5. Method according to claim 1, wherein the surface of the part of a building is a plaster surface.

6. Method according to claim 1, wherein the ratio of the ductility of the textile before the adhesive bonding to the ductility of the adhesive in the cured state is in the range from ≥1:1 to≤1:10.

7. Method according to claim 1, wherein the textile comprises a glass fiber woven fabric and the glass fiber woven fabric comprises glass fibers running at right angles to one another.

8. Method according to claim 1, wherein the textile comprises an at least biaxial woven fabric and additional fibers are arranged in the form of a nonwoven on the at least biaxial woven fabric.

9. Reinforced part of a building, comprising a textile adhesively bonded to its surface by means of an adhesive, wherein the textile before the adhesive bonding has a ductility of ≥1.0, the adhesive in the cured state has a ductility of ≥1.5 and the reinforced part of a building has a ductility of ≥2, wherein the ductility is in each case determined as the ratio of the value of the total elastic and plastic deformation to the value of the elastic deformation, and wherein the adhesive comprises an aqueous polyurethane dispersion comprising a polyurethane dispersed in water, wherein the polyurethane is the reaction product of the following components:

A1) polyisocyanates,

A2) polymeric polyols and/or polyamines having weight-average molar weights of from ≥400 g/mol to ≤8000 g/mol,

*and at least one compound selected from the group consisting of:*

A4) [at least one compound selected from compounds which have at least one ionic or potentially ionic group] *compounds which have in addition to isocyanate-reactive groups also sulfonium, ammonium, phosphate, phosphonium, carboxylate, sulfonate, or phosphonate groups, or groups that can be converted into sulfonium, ammonium, phosphate, phosphonium, carboxylate, sulfonate, or phosphonate groups by salt formation*, and A5) non-ionically hydrophilised compounds.

10. Reinforced part of a building according to claim 9, wherein the textile comprises an at least biaxial woven fabric and additional fibers are arranged in the form of a nonwoven on the at least biaxial woven fabric.

11. A method for reinforcing a part of a building, said method comprising adhesive bonding a textile to a surface of the part of a building by means of an adhesive, wherein the textile before the adhesive bonding has a ductility of ≥1.0, the adhesive in the cured state has a ductility of ≥1.5, wherein the ductility is determined in each case as the ratio of the value of the total elastic and plastic deformation to the value of the elastic deformation, and wherein the adhesive comprises an aqueous polyurethane dispersion comprising a polyurethane dispersed in water, wherein the polyurethane is the reaction product of the following components:

A1) polyisocyanates,

A2) polymeric polyols and/or polyamines having weight-average molar weights of from ≥400 g/mol to ≤8000 g/mol,

*and at least one compound selected from the group consisting of:*

A4) [at least one compound selected from compounds which have at least one ionic or potentially ionic group] *compounds which have in addition to isocyanate-reactive groups also sulfonium, ammonium, phosphate, phosphonium, carboxylate, sulfonate, or phosphonate groups, or groups that can be converted into sulfonium, ammonium, phosphate, phosphonium, carboxylate, sulfonate, or phosphonate groups by salt formation*, and A5) non-ionically hydrophilised compounds.

12. Method according to claim 11, wherein the textile comprises an at least biaxial woven fabric and additional fibers are arranged in the form of a nonwoven on the at least biaxial woven fabric.

13. Method for reinforcing a part of a building, said method comprising the step of adhesively bonding a textile to a surface of the part of the building by means of an adhesive, wherein the textile before the adhesive bonding has a ductility of ≥1.0, wherein the textile comprises a glass fiber woven fabric and the glass fiber woven fabric comprises glass fibers running at right angles to one another, wherein the adhesive in a cured state has a ductility of ≥1.5, wherein the adhesive comprises an aqueous polyurethane dispersion, wherein the adhesive comprises an aqueous polyurethane dispersion comprising a polyurethane dispersed in water, wherein the polyurethane is the reaction product of the following components:

A1) polyisocyanates,

A2) polymeric polyols and/or polyamines having weight-average molar weights of from ≥400 g/mol to ≤8000 g/mol,

*and at least one compound selected from the group consisting of:*

A4) [at least one compound selected from compounds which have at least one ionic or potentially ionic group] *compounds which have in addition to isocyanate-reactive groups also sulfonium, ammonium, phosphate, phosphonium, carboxylate, sulfonate, or phosphonate groups, or groups that can be converted into sulfonium, ammonium, phosphate, phosphonium, carboxylate, sulfonate, or phosphonate groups by salt formation*, and A5) non-ionically hydrophilised compounds, and wherein the ductility is in each case determined as the ratio of the value of the total elastic and plastic deformation to the value of the elastic deformation.

* * * * *